United States Patent
Tawil et al.

(10) Patent No.: US 6,926,427 B2
(45) Date of Patent: Aug. 9, 2005

(54) PROJECTOR ATTACHMENT FOR ELLIPSOIDAL LAMP

(75) Inventors: Joseph Tawil, Pacific Palisades, CA (US); Lee Conlon, Waterloo (AU)

(73) Assignee: GAMProducts, Inc., Los Angeles, CA (US)

( * ) Notice: Subject to any disclaimer, the term of this patent is extended or adjusted under 35 U.S.C. 154(b) by 131 days.

(21) Appl. No.: 10/652,649

(22) Filed: Aug. 28, 2003

(65) Prior Publication Data

US 2004/0041986 A1 Mar. 4, 2004

Related U.S. Application Data

(60) Provisional application No. 60/407,606, filed on Aug. 29, 2002.

(51) Int. Cl.[7] .............................................. F21V 17/02
(52) U.S. Cl. ...................................... 362/321; 362/281
(58) Field of Search ................................ 362/280, 281, 362/294, 321, 373; 353/85, 87, 88, 108, 109, 110, 120

(56) References Cited

U.S. PATENT DOCUMENTS 2,271,530 A * 2/1942 Wick ........................... 353/108
3,143,035 A * 8/1964 Morgan ......................... 353/87
5,791,755 A * 8/1998 Henry et al. ................. 353/120
6,793,349 B2 * 9/2004 Hooper ........................ 353/120

OTHER PUBLICATIONS

Source Four, HID 26: 426HID Series Electronic Theatre Controls pp. 4–19.1–4.19.2.
Source Four User Manual pp. 1–7.

* cited by examiner

*Primary Examiner*—Y. My Quach-Lee
(74) *Attorney, Agent, or Firm*—Townsend and Townsend and Crew LLP

(57) ABSTRACT

A process and apparatus reversibly converts an ellipsoidal stage lamp into a projector for projecting light with special effects onto a stage. The apparatus includes a replacement for the shutter section, which is a cabinet for disposition within the ellipsoidal stage lamp to replace the shutter section. The cabinet defines a first opening disposed along and around the optical axis of the ellipsoidal stage lamp and which is open to the base and lamp having a filament. The cabinet has one open side for permitting the sliding insertion of a drawer. The drawer, which is mountable to the cabinet, has a second opening disposed along and around the optical axis of the ellipsoidal stage lamp and open to the base and lamp when the drawer is inserted to the cabinet. A movable projector plane is mounted to the drawer across the second opening for insertion to the cabinet at the open side.

9 Claims, 6 Drawing Sheets

PROJECTOR ATTACHMENT FOR ELLIPSOIDAL LAMP

CROSS-REFERENCES TO RELATED APPLICATIONS

This application claims priority from U.S. Provisional Application Ser. No. 60/407,606 filed Aug. 29, 2002.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

This invention relates to projectors used on stages to project special lighting effects such as fire, rain, and snow. More particularly, a special effects projector attachment is disclosed for attachment to a conventional ellipsoidal stage lamp to enable rapid projector insertion into lighting arrays such as rows and columns of lamps on theatrical lighting trees.

BACKGROUND OF THE INVENTION

The most useful stage lamp for use in theatrical and related lighting is the ellipsoidal lamp. As is well known, an ellipse has two foci. Once such an ellipse is rotated 180°, the boundaries of the ellipse trace a three-dimensional figure known as an ellipsoid. Overall, the ellipsoid is egg-shaped with each of its foci disposed along the major axis of the ellipsoid at opposite ends of the egg. Understanding this three-dimensional geometry of an ellipsoid is important in understanding the optical function of an ellipsoidal stage lamp.

In a so-called ellipsoidal lamp, a reflector having an ellipsoid shape at one end of the ellipsoid is used to project light from the stage lamp. A light is placed with its filament at the focus of the ellipsoidal reflector. Light is projected by the ellipsoidal reflector to and towards the second focus of the ellipsoid. Since the second focus of the ellipsoid is located at an effective image plane, objects placed at the image plane will be projected by the lamp with reasonable definition for essentially the full "throw" or range of the stage lamp.

The second end of the ellipsoid of an ellipsoidal stage lamp is open. Light to be projected from the lamp is intercepted by projecting lenses at the open portion of the ellipsoid. Typically, the projecting lenses are given some excursion along the optical axis (major axis of the ellipsoid) with respect to the opening of the ellipsoid. This excursion allows the beam projected from the ellipsoidal stage lamp to be focused at the end of its throw (or light-projecting range) to provide the desired lighting effect. For example, where areas are being discreetly lit by an array of ellipsoidal lamps, it is often desired that the borders of illumination of the lamp be slightly out of focus or "soft." Alternatively, where "hard" borders are desired, such as lighting a small interior volume of the stage (for example a room with one wall open to the audience), the barrel focusing the projected beam can be given a sharp border.

Most commonly, shutters are placed at the second focus of the ellipsoid for controlling the borders of illumination projected from the ellipsoidal stage lamp. This enables a light designer to precisely trim the beam at its destination, which, in the case of a stage, is usually an area or volume to have a particular lighting effect.

Interestingly enough, the borders are optically reversed. For example, the top shutter trims the bottom border of the projected beam. Similarly, the right shutter trims the left border of the projected beam. This optical reversal applies to all borders and images projected from the second focus of the ellipsoidal stage light.

It is also known to project special patterns from ellipsoidal stage lamps. Many such patterns are intricately stamped out of metal sheeting, with the specific patterning desired projected on an incident stage surface, such as the cyclorama curtain commonly hung at the back of the stage. Gobos are typically static patterns placed in ellipsoidal lamps at the second focus to project patterns; they do not impart a moving effect to the projected light.

One of the most popular ellipsoidal lamps is manufactured by the Electronic Theater Controls Corp. of Middletown Wis. and sold under the trademark "Source IV." It is the use of the Source IV that constitutes the preferred embodiment of this invention.

In modern ellipsoidal lamp construction, the reflector and light-holding base are typically mounted to a yoke. Next, a shutter assembly and barrel are mounted over the light-holding base. Finally, a telescoping lens assembly is mounted for beam focus within the barrel. By moving the telescoping lens assembly relative to the remainder of the lamp, the projected beam can be focused, as it is incident upon its target.

As anyone who has been to the theater can attest, ellipsoidal lamps are typically mounted in tightly spaced rows and columns. The most common mounting of such lamps is in "balcony trees" where the lamps have an optimal angle with respect to the stage. It is to such a mounting of ellipsoidal lamps that this invention is especially directed.

Lighting designers use optically projected special lighting effects such as clouds, fire, rain, sleet, snow and the like. In the projection of such special lighting effects, an instrument known as a "projector" is typically employed. In such a projector, a light interior of the instrument projects the light to a focal plane. At the focal plane there is provided a medium of some kind to project the desired effect. For example, where clouds are desired, a horizontally moving reel can be used with elongate and irregular apertures in the reel. For fire, a similar reel moving in a vertically upward direction is used. For rain and snow, movement of the reels is in a generally downward direction. Alternately, rotating wheels having desired patterns to be projected can be used. Simply stated, patterns projected by modern stage projectors are limited only by the imagination of the lighting designer.

Because of their mechanical complication, projectors are usually large expensive instruments. Their mounting is far from simple. Because of their weight and mechanical/complexity, such projectors usually must be reserved to specially select mounting locations, such as a special portion of the balcony tree. Alternatively, the projectors can be placed within arrays of the ellipsoidal stage lamps provided; then almost all of the surrounding stage lamps are remounted and refocused.

Attempts have been made to modify conventional lighting instruments, such as ellipsoidal theatrical lamps, to accommodate projection of special effects. Typically, a conventional lamp is permanently altered and thereafter becomes part of a specialized projector. Again, because of size and mechanical complication, special mounting of the resulting instrument is required. Further, the altered ellipsoidal theatrical lamp can never be recovered for conventional use. After its alteration into a projector, the lamp is dedicated to its projector function and leaves the ordinary inventory of stage lighting instruments.

In Kleeman et al., U.S. patent application Ser. No. 09/672,586, filed Sep. 28, 2000, and entitled Linear Moving Pattern for Ellipsoidal Type Stage Light, a gobo-type pattern for placement within the drop-in iris slot of an ellipsoidal stage lamp is disclosed. While this instrument is useful in certain situations, the narrow confines of the iris slot give this instrument-restricted applicability. Further, this specialized instrument requires that the projecting reel be narrowed or "necked down" in order for the effect to occur within the iris aperture.

BRIEF SUMMARY OF THE INVENTION

A process and apparatus reversibly converts an ellipsoidal stage lamp into a projector for projecting light with special effects onto a stage. The ellipsoidal stage lamp has a base with a lamp having a filament; an ellipsoidal reflector mounted to the base, with the filament of the lamp at the focus of the ellipsoidal reflector; a shutter section for containing shutters to impart borders to a projected beam from the stage lamp; a barrel mounted to the shutter section; and a lens tube having projecting lenses for slidable mounting within the barrel, for projecting and focusing a projected beam from the ellipsoidal stage lamp. The apparatus includes a replacement for the shutter section, which is a cabinet for disposition within the ellipsoidal stage lamp to replace the shutter section. The cabinet defines a first opening disposed along and around the optical axis of the ellipsoidal stage lamp and which is open to the base and lamp having a filament. The cabinet has one open side for permitting the sliding insertion of a drawer. The drawer, which is mountable to the cabinet, has a second opening disposed along and around the optical axis of the ellipsoidal stage lamp and open to the base and lamp when the drawer is inserted to the cabinet. A movable projector plane is mounted to the drawer across the second opening for insertion to the cabinet at the open side. Reversible conversion of the ellipsoidal stage lamp includes removal of the shutter assembly and replacement by the cabinet. Thereafter, the drawer is inserted in the cabinet to register the first opening of the cabinet with the second opening in the drawer. When the movable projector plane is activated, patterns on the movable projector plane are projected through the reversibly altered ellipsoidal stage lamp for the projection of special effects.

DETAILED DESCRIPTION OF THE INVENTION

Figure 1:
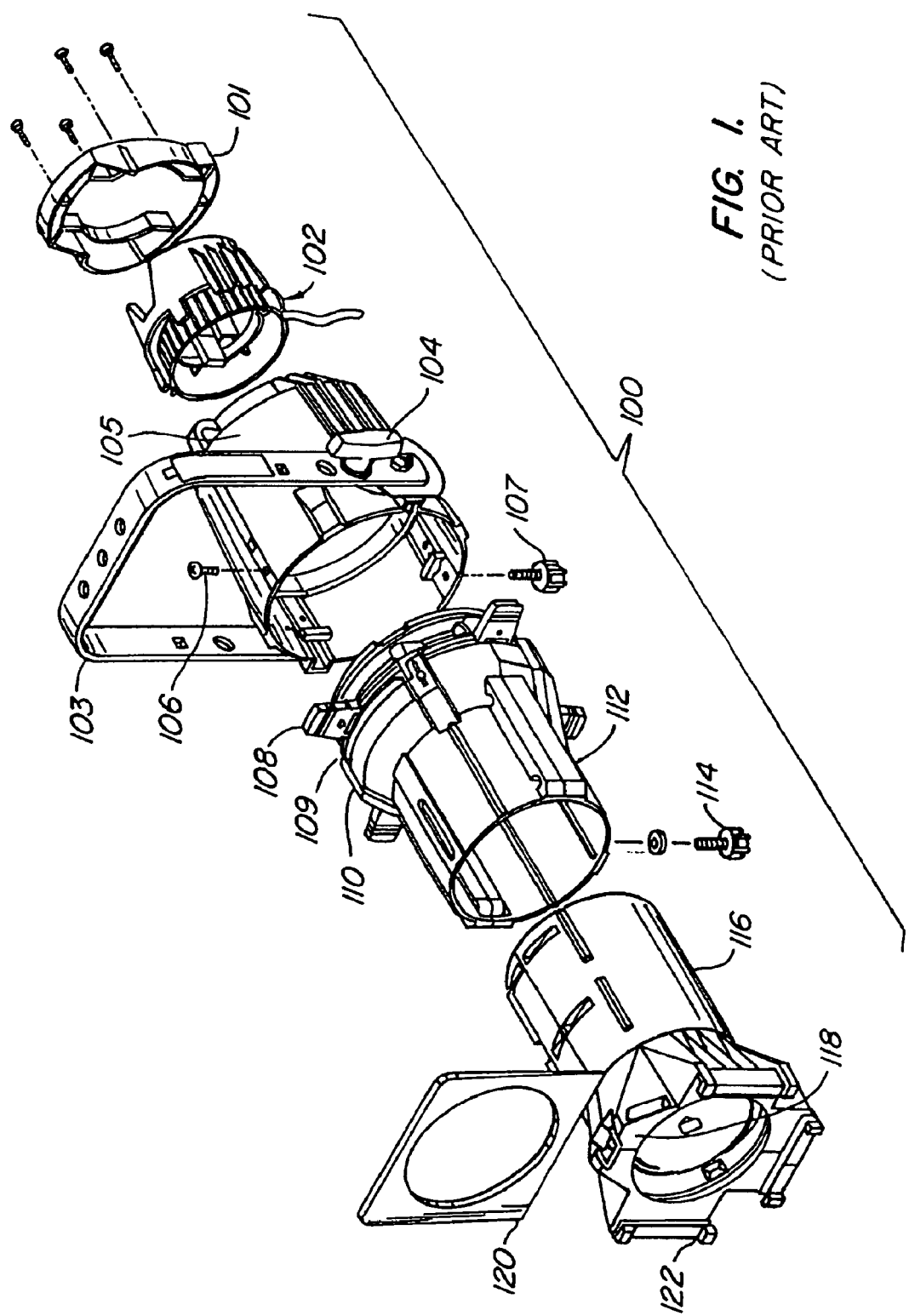
FIG. 1 is an exploded view of a prior art ellipsoidal stage lamp.

Referring to FIG. 1, an exploded view of ellipsoidal stage lamp 100 of the prior art is shown. Base-mounting yoke 103 has lamp base and ellipsoidal reflector 102 and lamp handle 101 mounted and locked into position by yoke locking knob 104. As discussed below, cabinet 200 is mounted to this portion of the lamp for the reversible conversion of ellipsoidal stage lamp 100 into a projector.

Shutter assembly-retaining bolts 106 and barrel rotation knob 107 hold shutters 108 to reflector housing 105. The shutter assembly contains pattern-holding slot 109 and includes drop-in iris 110. When the shutter assembly is temporarily removed, and cabinet 200 inserted to the lamp, reversible conversion to a projector can occur.

Base-mounting bayonet fitting 111 (hidden from view, see FIG. 3) is coupled to barrel 112. Barrel 112 mounts beam focus knob 114. Finally, lens tube 116, containing projecting lenses telescopes within barrel 112, is adjusted in such telescoping relation by beam focus knob 114 to focus the beam ultimately projected.

Figure 2:
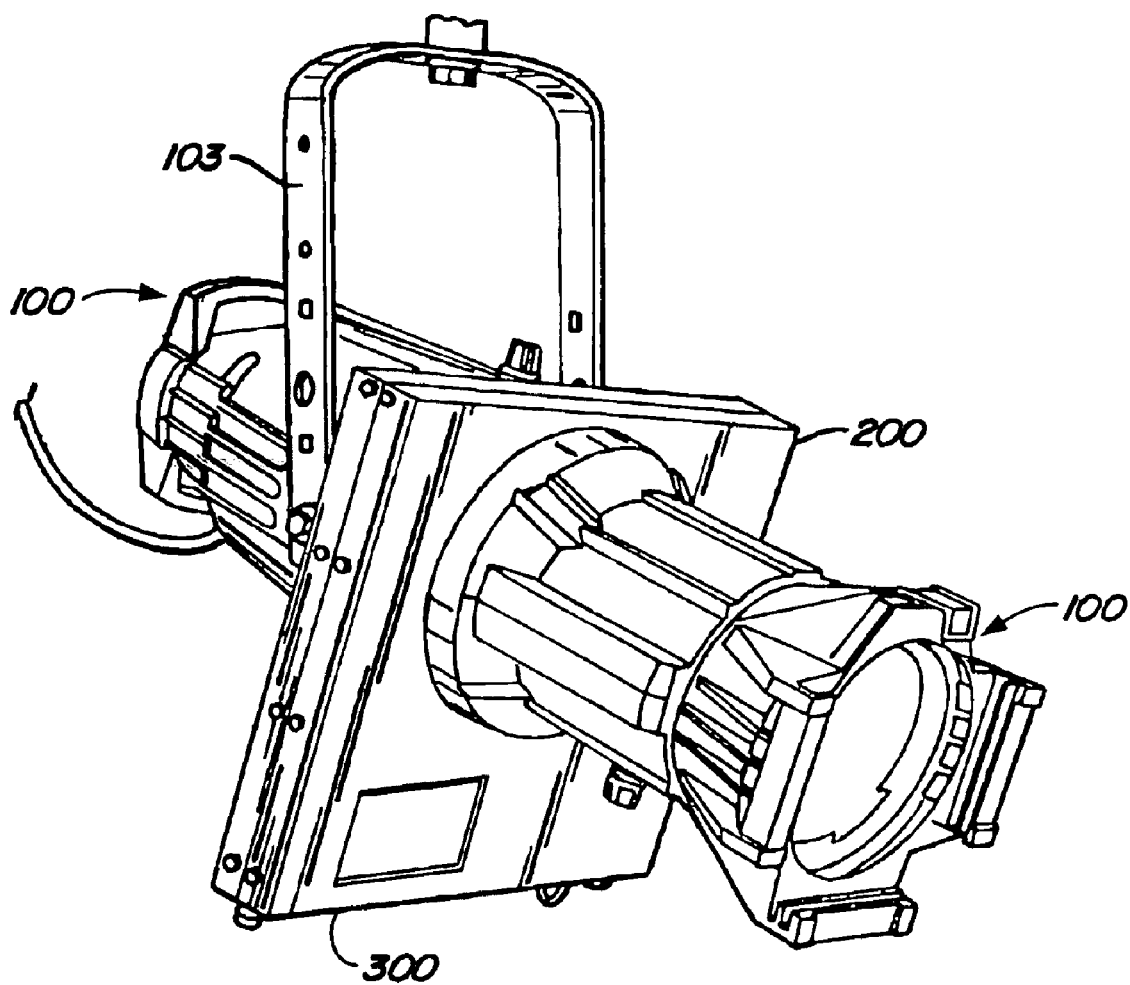
FIG. 2 is an assembled view of the ellipsoidal stage lamp of FIG. 1 with the shutter housing removed and cabinet inserted, with the ellipsoidal lamp converted to a projector and oriented for projecting special effects.

Conversion of ellipsoidal stage lamp 100 into a projector is seen in FIG. 2. Simply stated, the shutter assembly has been removed and cabinet 200 inserted into its place between barrel 112 and reflector housing 105. In the view of FIG. 2, the projector-converted ellipsoidal stage lamp 100 is shown suspended from yoke 103 with drawer 300 inserted interior of the cabinet for special effects projection.

Figure 3:
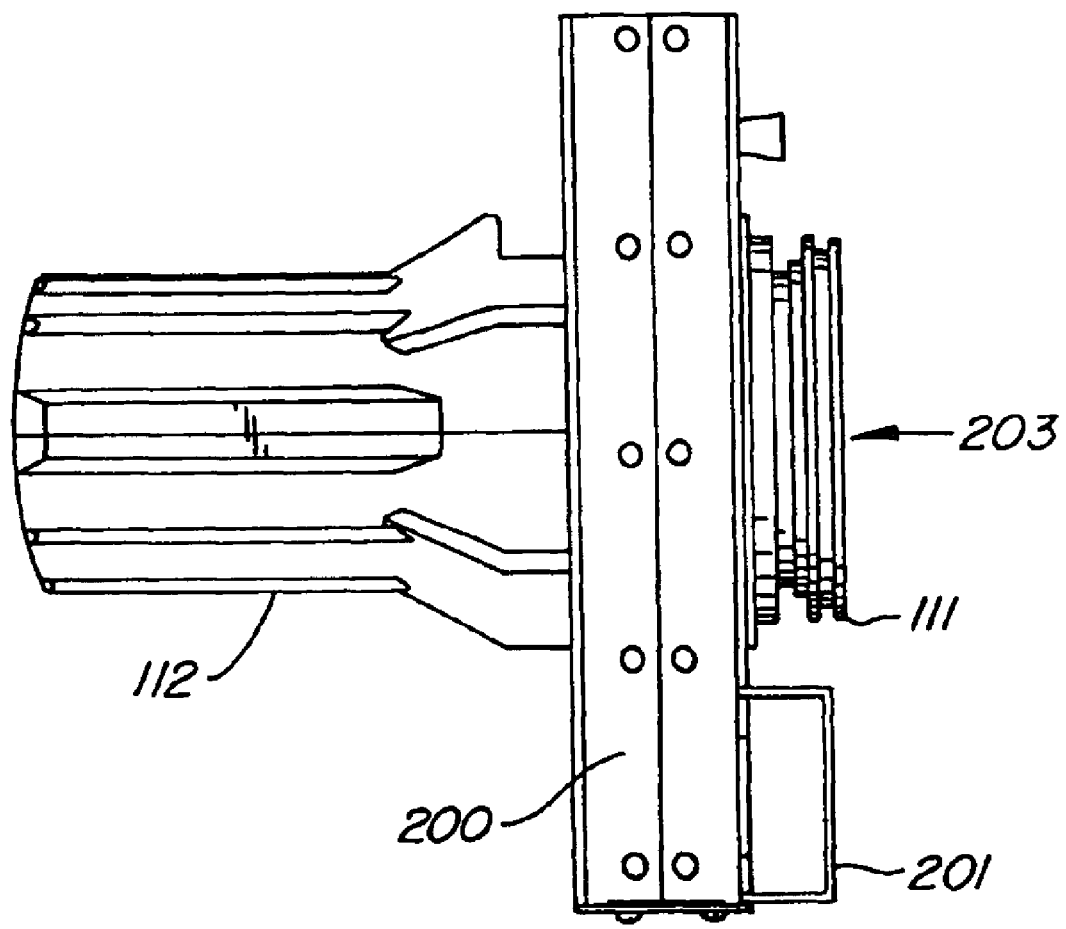
FIG. 3 is a signed elevation taken at the cabinet illustrating a bayonet-type fitting for attachment to the ellipsoidal stage lamp base with the barrel disposed from the cabinet for receiving the lens tube.

Referring to FIG. 3, barrel 112 is shown fastened at one side of cabinet 200 with base-mounting bayonet fitting 111 fitted on the opposite side of cabinet 200. The cabinet includes a central aperture 203 for permitting light projected from reflector housing 105 to pass through the cabinet and barrel 112 for projection. (Central aperture 203 is hidden from view, but is generally coextensive with drawer aperture 406 described below.)

Figure 4:
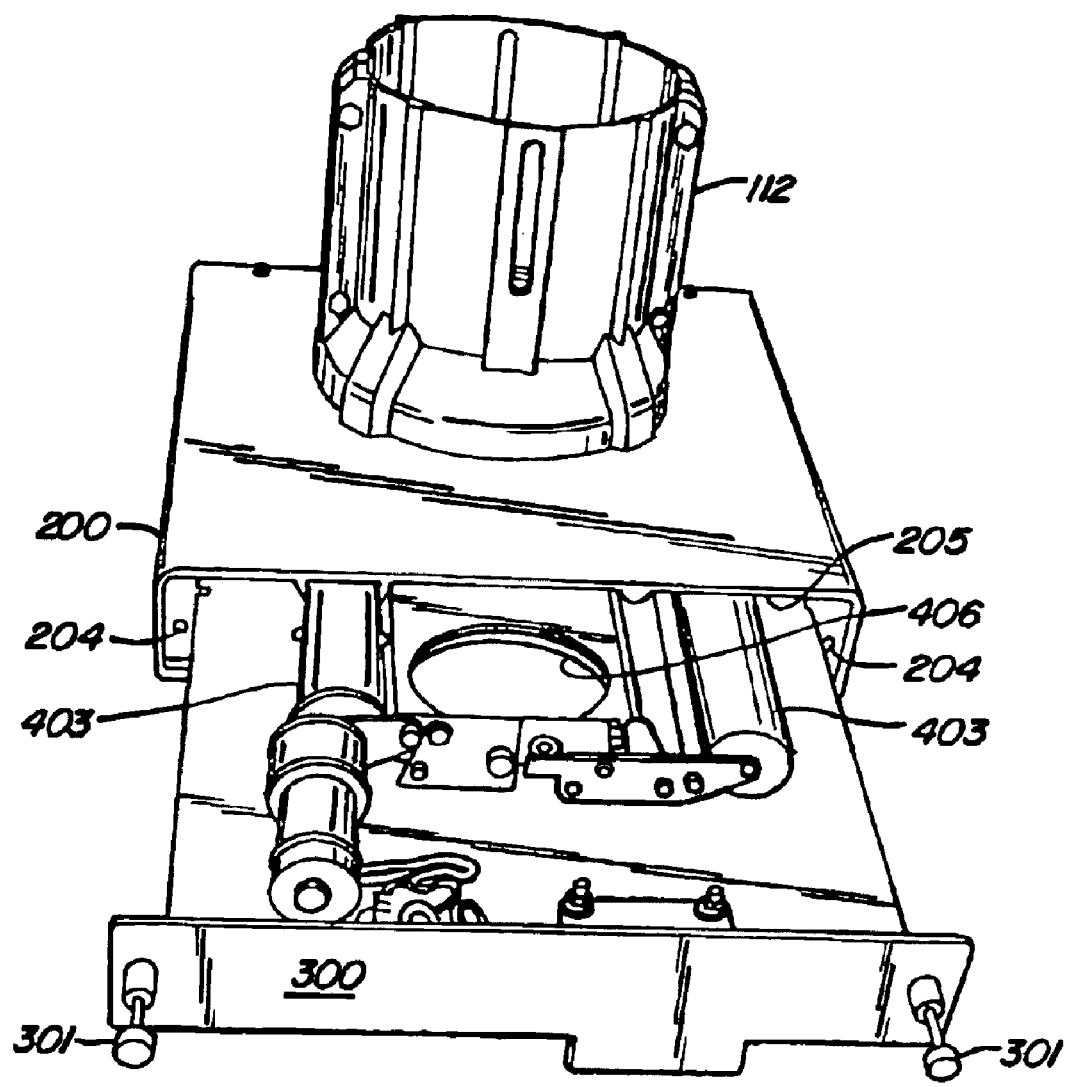
FIG. 4 is a perspective view of the cabinet from the open side with a drawer having parallel rollers for rotating an endless film for the projection of special effects; and, FIG. 5 is a perspective view of the drawer of FIG. 4 removed from the cabinet illustrating the placement of the endless film on the rollers for the projection of special effects.

Referring to FIG. 4, cabinet 200 is shown at cabinet opening 205 with a drawer 300 partially inserted therein. The drawer retaining screws 301 mate with drawer retainer threads 204 to fasten drawer 300 securely within the cabinet.

Figure 5:
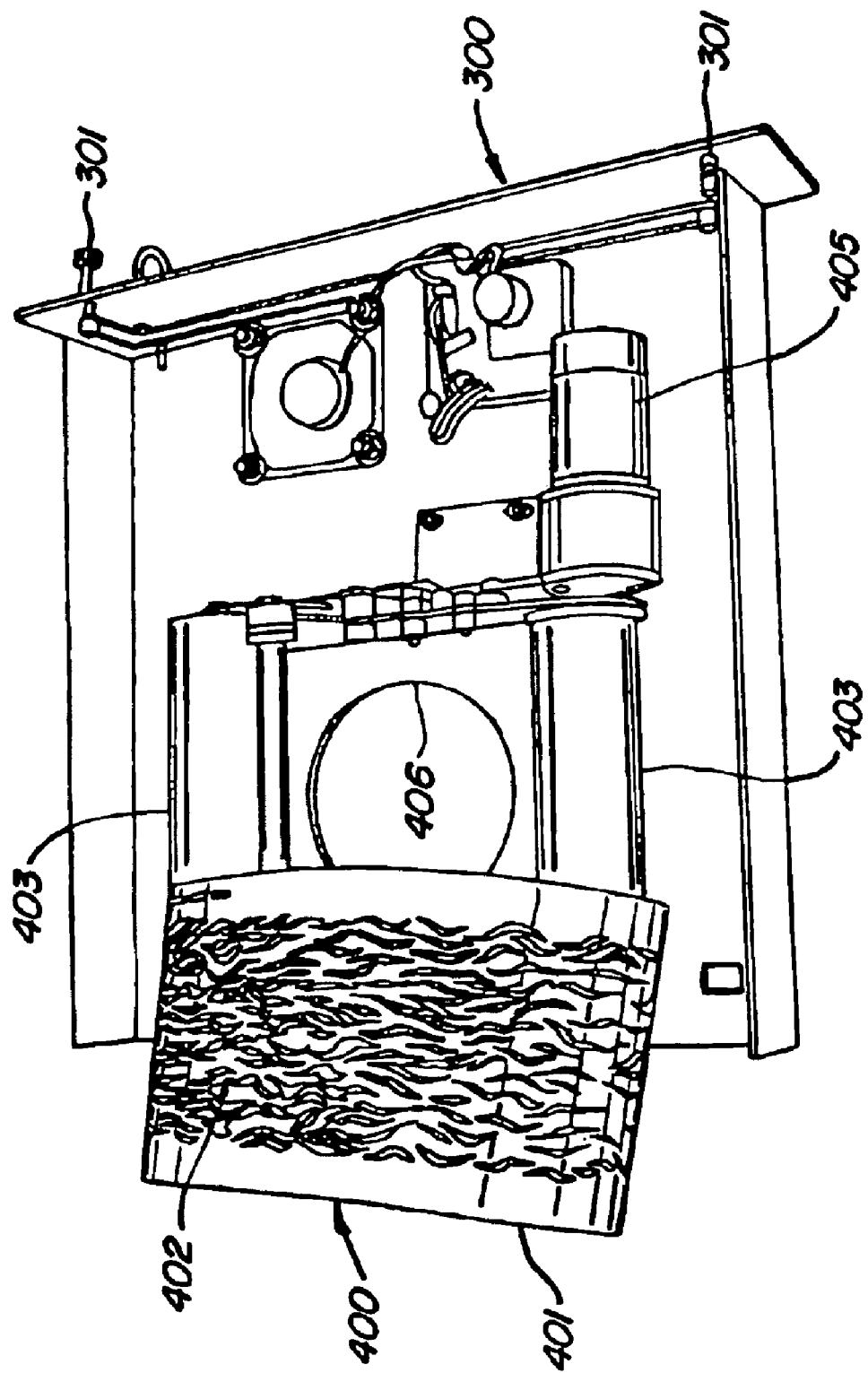

In the view of FIG. 4, movable projector plane 400 is not shown. A movable projector plane 400 is shown as endless plane 401 in FIG. 5. Paired reel rollers 403 are shown on opposite sides of drawer aperture 406 with reel roller motor 405 for driving the rollers at a controlled rate. Referring to FIG. 5, endless plane 401 is illustrated having cloud patterns 402.

As can be understood, one side of endless plane 401 is registered to the focal plane of ellipsoidal stage lamp 100; the other side of endless plane 401 is out of registration with respect to the focal plane of ellipsoidal stage lamp 100. The out-of-registration portion of endless plane 401 permits modulated light to the incident light on the focal plane registered portion of endless plane 401. As a result, patterns 402 are projected with a modulated effect, which, dependent upon the color used with the ellipsoidal stage lamp 100, can produce either a cloud effect when oriented for horizontal movement or a fire effect when oriented for vertical movement.

As of the writing of this Provisional Patent Application, alternative accessories for placement of drawer 300 are contemplated. Those accessories include a slide projector (for up to 8 slides) as well as a rotating gobos. Other accessories can clearly be used.

It will further be appreciated that virtually any ellipsoidal stage lamp 100 in an array of such lamps can be converted for projection without disturbance of any of its neighboring lamps. Thus it will be seen that the disclosed invention enables rapid conversion of any selected ellipsoidal stage lamp into a projector without disturbing neighboring focused and adjusted lamps.

Figure 6:
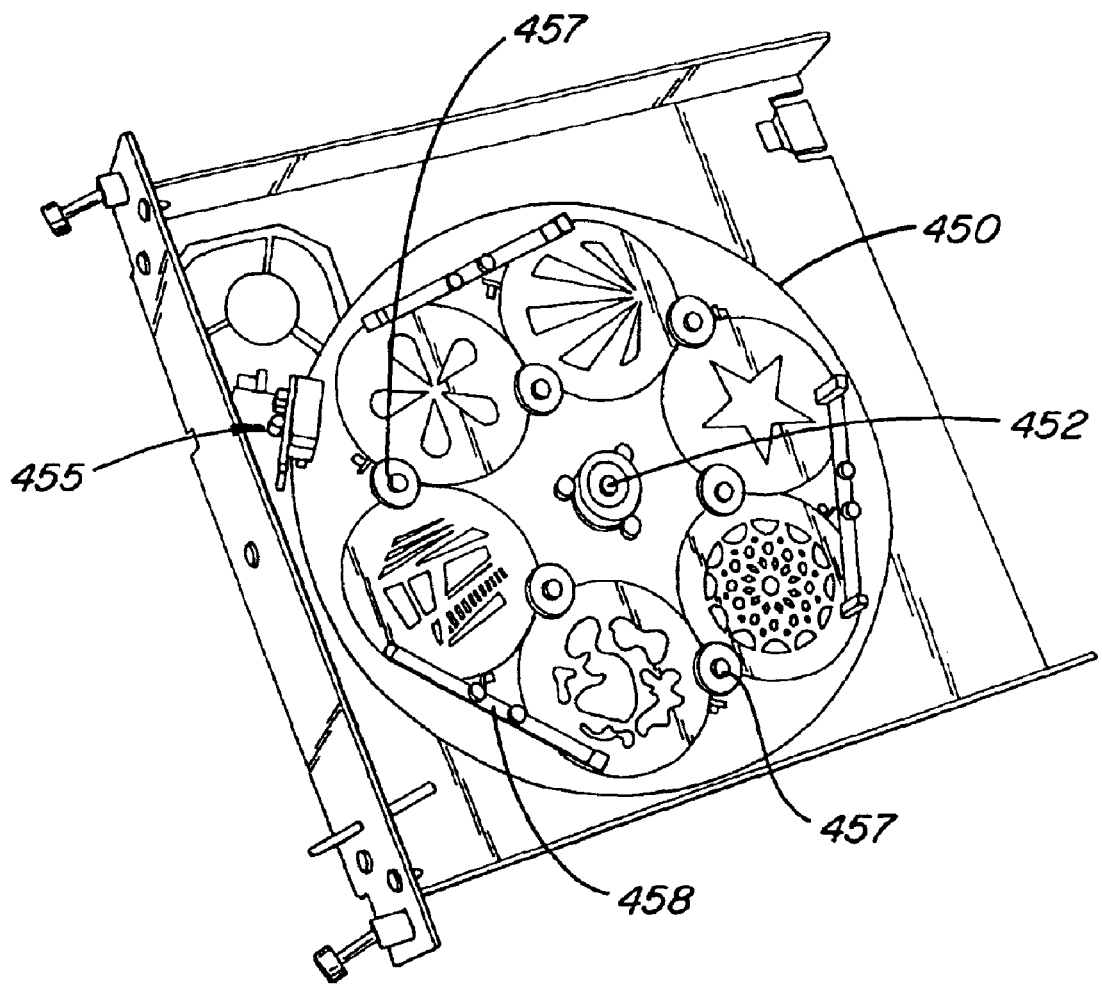
FIG. 6 is a perspective view of a drawer similar to the drawer of FIG. 4 removed from the cabinet illustrating the placement of an array of six GOBOs placed on a wheel within the drawer with a stepper motor for rotating on command the respective GOBOs into registration with the focus of the ellipsoidal stage lamp.

Referring to FIG. 6, and as of the filing of this Non Provisional Patent Application, the movable projector plane 400 includes a rotating wheel 450. Wheel 450 includes a central axis 452 for rotation and a driving stepper motor 455 to cause rotation of wheel 450. Circular clamps 457 and bar clamps 458 hold six discrete slides, here shown as GOBOs, overlying six discrete apertures (shown only through the center of the attached GOBOs). Driving stepper motor 455 is responsive to conventional DMX signals and on appropriate command causes a desired GOBO to register to the projecting plane of the ellipsoidal stage lamp. In this way, GOBO lighting effects can be remotely changed up on command from the lighting console.

It will be understood, that GOBOs can have conventional slides for projection by the ellipsoidal stage lamp. Likewise, other substitutions can be made including conventional gels for adding selective color to the projection of the lamp.

What is claimed is:

1. In an ellipsoidal stage lamp for projecting light along an optical axis onto a stage, the ellipsoidal stage lamp having:

a base with a lamp having a filament;

an ellipsoidal reflector mounted to the base with the filament of the lamp at the focus of the ellipsoidal reflector;

a shutter section for containing shutters to impart borders to a projected beam from the stage lamp;

a barrel mounted to the shutter section; and, a lens tube having projecting lenses for slidable mounting within the barrel for projecting and focusing a projected beam from the ellipsoidal stage lamp;

an improvement including a replacement for the shutter section comprising:

a cabinet for disposition within the ellipsoidal stage lamp to replace the shutter section;

the cabinet defining a first opening disposed along and around the optical axis of the ellipsoidal stage lamp and open to the base and lamp having a filament;

the cabinet having at least one open side for permitting the sliding insertion of at least one drawer;

the at least one drawer having a second opening disposed along and around the optical axis of the ellipsoidal stage lamp and open to the base and lamp when inserted to the cabinet; and, a movable projector plane mounted to the drawer across the second opening for insertion to the cabinet at the at least one open side, whereby the movable projector plane mounted to the drawer can be projected by the ellipsoidal stage lamp from the second opening in the drawer.

2. The improvement to an ellipsoidal stage lamp in accordance with claim 1 and wherein:

the drawer having mounted thereto the movable projector plane includes an endless projector plane for rotation on opposite sides of the second opening of the drawer;

parallel rotating members on either side of the first opening of the cabinet for moving the endless projector plane across the second opening of the drawer; and, patterns on the endless projector plane for projecting light passing through the patterns from the ellipsoidal stage lamp.

3. The improvement to an ellipsoidal stage lamp in accordance with claim 1 and wherein:

a ventilation aperture in the side walls of the cabinet permits cooling of the movable projecting plane.

4. The improvement to an ellipsoidal stage lamp in accordance with claim 1 and wherein:

the cabinet includes a bayonet fitting for insertion to the base of the ellipsoidal stage lamp.

5. The improvement to an ellipsoidal stage lamp in accordance with claim 1 and wherein:

the cabinet includes a locking attachment to the barrel of the ellipsoidal stage lamp.

6. The improvement to an ellipsoidal stage lamp in accordance with claim 1 and wherein:

the movable projector plane includes a plurality of slides; and, means for the intermittent movement of at least one of the slides to the second opening for projecting an image on the slide from the ellipsoidal stage lamp.

7. The improvement to an ellipsoidal stage lamp in accordance with claim 6 and wherein:

the plurality of slides includes at least one GOBO.

8. The improvement to an ellipsoidal stage lamp in accordance with claim 1 and wherein:

the movable projector plane mounted to the drawer includes a wheel having apertures for registration through the second opening of the drawer.

9. A process of projecting special effects from an ellipsoidal stage lamp along an optical axis of the ellipsoidal stage lamp onto a stage comprising the steps of:

providing an ellipsoidal stage lamp having:

a base with a lamp having a filament;

an ellipsoidal reflector mounted to the base with the filament of the lamp at the focus of the ellipsoidal reflector;

a shutter section for containing shutters to impart borders to a projected beam from the stage lamp;

a barrel mounted to the shutter section; and, a lens tube having projecting lenses for slidable mounting within the barrel for projecting and focusing a projected beam from the ellipsoidal stage lamp;

providing a cabinet for disposition within the ellipsoidal stage lamp to replace the shutter section, the cabinet defining a first opening disposed along and around the optical axis of the ellipsoidal stage lamp and open to the base and lamp having a filament, and the cabinet having at least one open side for permitting the sliding insertion of a drawer;

removing the shutter section from the ellipsoidal stage lamp;

attaching the cabinet between the base and barrel with the first opening disposed along and around the optical axis of the ellipsoidal stage lamp;

providing the drawer having a second opening registered along and around the optical axis of the ellipsoidal stage lamp and open to the base and lamp when inserted in the cabinet;

inserting the drawer in the cabinet to register the second opening along and around the optical axis of the ellipsoidal stage lamp;

providing a movable projector plane having patterns mounted to the drawer across the second opening for insertion in the cabinet at the at least one open side;

moving the movable projector plane whereby the movable projector plane patterns can be projected by the ellipsoidal stage lamp from the second opening in the drawer.

\* \* \* \* \*